United States Patent
Kessler et al.

(10) Patent No.: US 9,906,468 B2
(45) Date of Patent: Feb. 27, 2018

(54) PACKET TRAFFIC CONTROL IN A NETWORK PROCESSOR

(75) Inventors: Richard E. Kessler, Northborough, MA (US); Michael Sean Bertone, Marlborough, MA (US)

(73) Assignee: Cavium, Inc., San Jose, CA (US)

( * ) Notice: Subject to any disclaimer, the term of this patent is extended or adjusted under 35 U.S.C. 154(b) by 672 days.

(21) Appl. No.: 13/283,252

(22) Filed: Oct. 27, 2011

(65) Prior Publication Data
US 2013/0107711 A1 May 2, 2013

(51) Int. Cl.
*H04L 12/933* (2013.01)
*H04L 12/873* (2013.01)

(52) U.S. Cl.
CPC ............ *H04L 49/15* (2013.01); *H04L 47/52* (2013.01)

(58) Field of Classification Search
CPC ....... H04L 47/266; H04L 47/33; H04L 49/50; H04L 47/52; H04L 49/15
USPC .................................................. 370/229, 235
See application file for complete search history.

(56) References Cited

U.S. PATENT DOCUMENTS

| | | | |
|---|---|---|---|
| 6,975,638 B1 * | 12/2005 | Chen | H04L 12/5693 370/232 |
| 2004/0170133 A1 * | 9/2004 | Oguchi | H04L 67/1002 370/299 |
| 2005/0270976 A1 * | 12/2005 | Yang et al. | 370/229 |
| 2006/0265526 A1 * | 11/2006 | Holbrook | 710/52 |

OTHER PUBLICATIONS

"Cavium Networks Unveils OCTEON II CN68XX—Industry's Highest-Performance Multi-Core Processors for Energy-Efficient Data Center, Mobile Internet and the Borderless Enterprise" (May 10, 2010).

* cited by examiner

*Primary Examiner* — Brandon Renner
*Assistant Examiner* — Mandish Randhawa
(74) *Attorney, Agent, or Firm* — Hamilton, Brook, Smith & Reynolds, P.C.

(57) ABSTRACT

A network processor controls packet traffic in a network by maintaining a count of pending packets. In the network processor, a pipe identifier (ID) is assigned to each of a number of paths connecting a packet output to respective network interfaces receiving those packets. A corresponding pipe ID is attached to each packet as it is transmitted. A counter employs the pipe ID to maintain a count of packets to be transmitted by a network interface. As a result, the network processor manages traffic on a per-pipe ID basis to ensure that traffic thresholds are not exceeded.

11 Claims, 5 Drawing Sheets

PACKET TRAFFIC CONTROL IN A NETWORK PROCESSOR

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Embodiments of the present invention provide a system for controlling packet traffic in a network. A plurality of network interfaces transmit packets to a plurality of receivers across a network. A control circuit selects the packets for forwarding to the plurality of network interfaces. The control circuit further attaching a pipe identifier (ID) to each of the packets. The pipe ID indicates a path connecting the control circuit to one of the plurality of network interfaces through which the packet is to be transmitted. A counter maintains a count of packets to be transmitted by each network interface per pipe ID. The counter compares this count against a threshold and provides an indication to the control circuit in response to the count exceeding the threshold.

In further embodiments, the control circuit, in response to the indication from the counter, can limit packet traffic through the path associated with the pipe ID. The control circuit may also limit packet traffic through one of the paths in response to receiving a backpressure command from one of the receivers. The counter may also maintain a count of bytes of the packets to be transmitted by the network interface per pipe ID. The counter may compare this count of bytes against a byte threshold and provide a second indication to the control circuit in the event that the count of bytes exceeds the threshold. The control circuit, in response to the second indication from the counter, may limit packet traffic through the path associated with the pipe ID.

In still further embodiments, the path can include a port at the control circuit and a channel connecting one of the network interfaces to one of the receivers. The counter can be configured to increment a value in response to the control circuit scheduling one of the packets for transmittal to one of the plurality of network interfaces, where the value is associated with the packet ID of the packet. Conversely, the counter may decrement the value in response to the network interface transmitting the packet to the receiver. The counter may also maintain an additional count of packets to be transmitted by each network interface, the additional count being specific to an individual one of the plurality of network interfaces. The counter may compare the additional count against a threshold, and provide an indication to the control circuit in the event that the count exceeds the threshold. The counter may also maintain the count based on a status of a number of buffers at each of the plurality of network interfaces, each of the buffers being associated with a path. In further embodiments, the counter may maintain the count based on a status of a number of buffers at the control circuit, each of the buffers being associated with a path.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Before describing example embodiments of the present invention in detail, an example network security processor in which the embodiments may be implemented is described immediately below to help the reader understand the inventive features of the present invention.

Figure 1A:
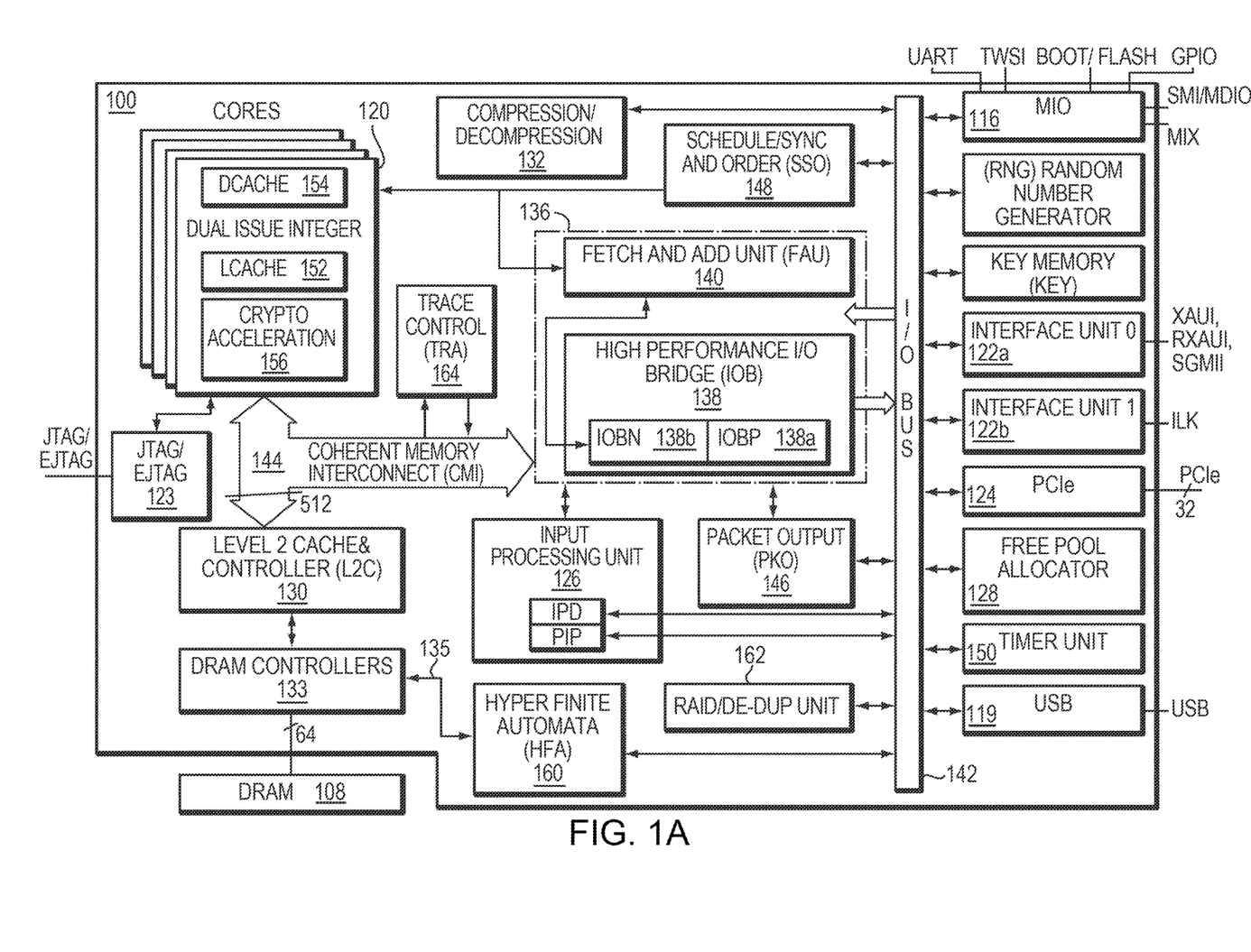
FIG. 1A is a block diagram illustrating a network services processor in which embodiments of the present invention may be implemented.

FIG. 1A is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122*a* can receive packets from a plurality of X Attachment Unit Interfaces (XAUI), Reduced X Attachment Unit Interfaces (RXAUI), or Serial Gigabit Media Independent Interfaces (SGMII). At least one interface unit 122*b* can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138*a* and an I/O Bus Bridge (IOBN) 138*b*. The I/O Packet Bridge 138*a* is configured to manage the overall protocol and arbitration and provide coherent I/O portioning with primarily packet input and output. The I/O Bus Bridge 138*b* is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

Embodiments of the present invention may be implemented in the network services processor 100 shown in FIG. 1A, and may be directed more particularly to the packet output unit (PKO) 146, as well as the interface units 122. Example embodiments are described in further detail below with reference to FIGS. 2-4.

Figure 1B:
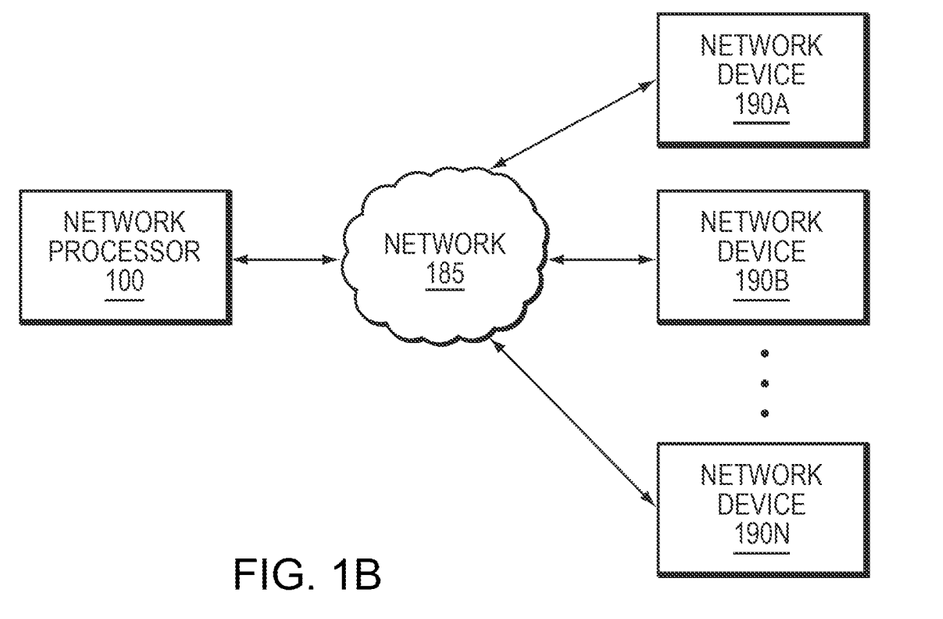
FIG. 1B is a block diagram illustrating a network processor in a network configuration.

FIG. 1B is a block diagram illustrating a network processor 100 in a network configuration. The network processor 100 may be configured to communicate with one or more network devices 190A-190N across a network 185 (e.g., a local network or the Internet) via a network interface unit (e.g., interface units 122a-b described above with reference to FIG. 1A).

Figure 2:
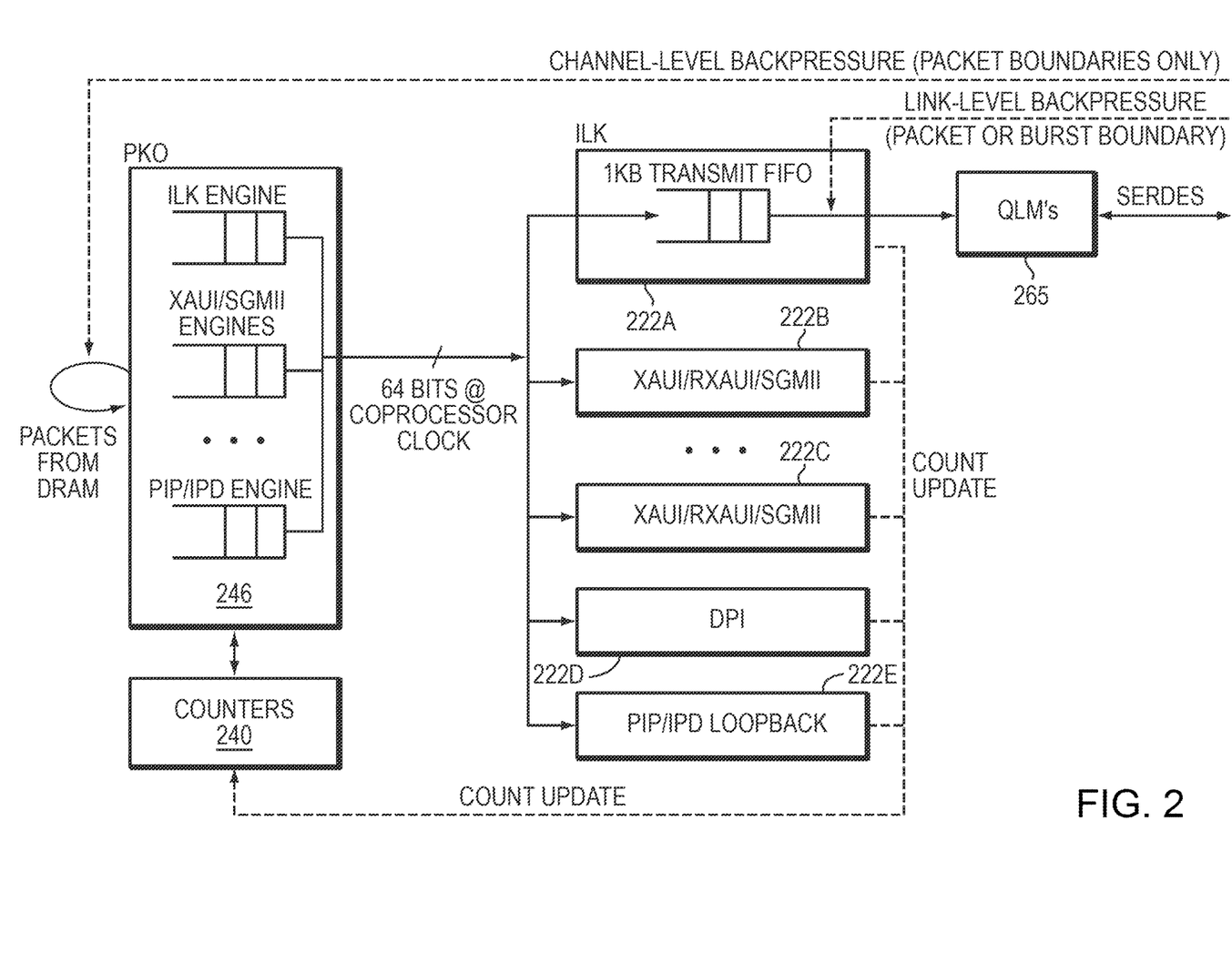
FIG. 2 is a block diagram of a packet output (PKO) circuit and associated components in one embodiment.

FIG. 2 is a block diagram of a packet output unit (PKO) 246 and network interfaces 222A-E configured to control packet traffic in one embodiment. The packet output unit 246 and network interfaces 222A-E may be implemented in the network processor 100 as the packet output unit 146 and interface units 122, respectively. The packet output unit 246 reads packet data from a memory unit (e.g., Level-2 cache and DRAM), performs post-processing of the packets, and forwards the packets to the network interfaces 222A-E for transmittal across a network. The quad lane module (QLM) 265 provides low-level drive and receive logic for the SERDES chip I/Os.

A "transmit data path," or "path," can be defined as the path carrying a packet from the packet output unit 246 to a particular network interface (e.g., the network interface 222A), which convert the packet bytes into a network link output. The packet output unit 246 may include a number of engines (e.g., ILK engine, XAUI/SGMII engines, PIP/IPD engine) that are assigned to the various interfaces. DRAM packets are assigned to the engines, each of which has a buffer for storing packet data prior to forwarding the packet. The packet output unit 246 may utilize scheduling algorithms to arbitrate among the packets to be sent to the network interfaces 222A-E. A packet output unit 246 engine schedules the necessary DRAM reads to move the packet data into its buffer, and then schedules the writes to move the packet data from its buffer to the interface's transmit buffer.

The network interfaces 222A-E normally transmit bursts of packet data once it has accumulated sufficient packet data in its transmit buffer (e.g., a 1-kilobyte FIFO as shown at network interface 222A). The interfaces 222A-E may receive two forms of backpressure from a network device (e.g., network devices 190A-N in FIG. 1B) to control the flow of packet data. Link-level backpressure is implemented to prevent a network interface, such as network interface 222A, from transmitting the next burst of data from its transmit buffer. In contrast, channel-level backpressure affects a corresponding scheduling algorithm at the packet output unit 246, which is much earlier in the pipeline, and prevents packets being processed prior to forwarding to the network interface 222A. The channel-level backpressure may also trigger a hold simultaneously at the buffer of the respective network interface 222A.

Employing channel-level and/or link-level backpressure, without further traffic control measures, may be insufficient for preventing excessive packet traffic. In particular, there may be a delay between when a backpressure command is transmitted by a network device and when the packet output unit 246 or network interface 222A-E ceases to transmit packets. During this delay, packets may continue to be transmitted to the network device. Moreover, even when the packet output unit 246 or network interface 222A-E ceases to transmit packets, downstream packets may already be in the path to the network device, thereby causing further congestion.

Accordingly, example embodiments employ a solution for packet traffic at the packet output unit 246 and the network interfaces 222A-E. As described above, a "path" can be defined as the logical and physical channels carrying a packet from the packet output unit 246 to a particular network interface (e.g., the network interface 222A). Each such path may be considered to be a "pipe," and is accordingly assigned a pipe identifier (ID), which may be a numerical or other value. For example, a particular pipe may be defined to encompass the ILK engine at the packet output unit 246, the output buffer at the network interface 222A, and any physical or logical links connecting the packet output unit 246 and the network interface 222A. A network processor may configure a fixed number of pipes, where the mappings of pipes to engines and engines to interfaces can be static and configured by a user. A given engine can support more than one pipe. In an example embodiment, a given physical interface is serviced by at most one engine, though it is possible to assign more than one engine to a physical interface. Each pipe corresponds to different buffers/FIFOs at the interface. Amongst the pipes assigned to a single physical interface (e.g. ILK, XAUI PFC), different pipes will generally be assigned to or linked with different logical channels on the interface. Alternatively, a network processor may not require a one-to-one linkage between pipes and logical channels, where multiple pipes per logical channel are assigned. Multiple logical channels may also be assigned per pipe (in XAUI PFC). To support multiple logical channels per pipe, a receiver may have per-interface (i.e. per-link) buffering/FIFOing that the PKO per-interface transmit counters can be configured to prevent overflow, and separate per-logical-channel buffering/FIFOing that the PKO per-pipe transmit counters can be configured to prevent overflow.

A packet that is to be transmitted through each of the elements of a pipe is therefore associated with that pipe, and the corresponding pipe ID can be attached to that packet. The packet output unit 246, on receipt of a packet for output, may determine the pipe through which the packet is to be transmitted, and attaches the corresponding pipe ID to the packet (see FIG. 3A, described below). Based on this information, upon scheduling the packet for output, the packet output unit 246 may transmit a first count update to a counter unit 240. The counter unit 240 may be integrated into the packet output unit 246, or may be an independent unit of a network processor, implemented in hardware and/or software. The count update may include the pipe ID, word count (or other data size indicator) of the packet, and a packet count (see FIGS. 3B-C, described below).

The packet output unit 246 then forwards the packet, with the pipe ID, through the components associated with the pipe to the associated network interface (e.g., network interface 222A). The network interface 222A receives the packet, performs any further processing on the packet as required, and transmits the packet to a network device (e.g., network devices 190A-N in FIG. 1B). In addition, the network element 222A collects information about the packet, such as data size or word count of the packet, as well as the pipe ID of the packet.

Based on this information, when the network interface transmits, or "clears," the packet, the network element 222A may transmit a second count update to a counter unit 240 (the first count update originating from the packet output unit 246 as described above). The second count update may be comparable to the first, including the pipe ID, word count (or other data size indicator) of the packet, and a packet count. The second count update may further provide an indication that the packet was cleared.

The counter unit 240 maintains one or more counters for each pipe. For example, a packet counter can be configured to maintain a count of packets for a particular pipe. The packet counter increments in response to a count update that indicates a packet was received at the corresponding network interface through the pipe, and decrements in response to a count update that indicates a packet was cleared from that network interface through the pipe. As a result, the packet counter maintains a count of the total packets ("packet count") that have been scheduled by the packet output unit 246 and are pending transmittal at the respective network interface. Further, a word counter can be configured to maintain a count of the total data (e.g., bytes) for a particular pipe. The word counter increments in response to a count update that indicates a packet was received at the corresponding network interface through the pipe, and decrements in response to a count update that indicates a packet was cleared from that network interface through the pipe. The increment and decrement values correspond to the word size indicated by each count update. As a result, the word counter maintains a count of the total data size ("word count") of packets in a particular pipe that have been scheduled and are pending for transmittal at the respective network interface.

The counter unit 240 may further compare the packet count and/or work count of a pipe against a predetermined threshold. For example, a threshold can be a numerical value that is exceed when its most significant bit (MSB) is "1." Such a comparison may be performed continuously, periodically, or in response to a received command. If the packet count and/or word count exceeds the threshold, the counter unit 240 may transmit a backpressure command to the packet output unit 246. In response to the backpressure command, a scheduling algorithm at the packet output unit 246 refrains from scheduling any packets for transmittal through the respective pipe. As a result, packet traffic through the pipe, and thereby traffic at each of the engines and buffers associated with that pipe, is maintained within an acceptable level. Moreover, traffic control is enacted earlier than by backpressure from a network device, thus avoiding packet congestion along the pipe.

Figure 3A:
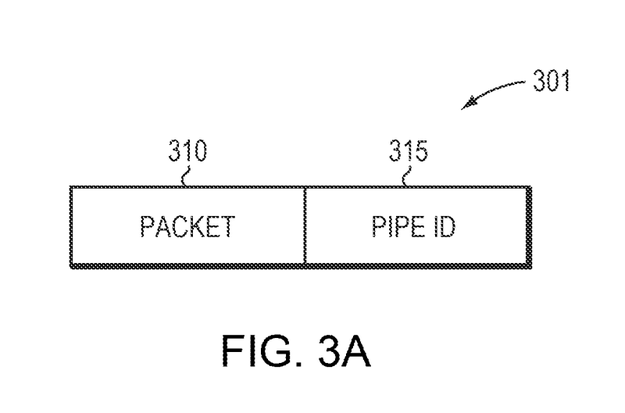
FIG. 3A is a block diagram illustrating an example packet transmitted from a packet output unit to a network interface.

FIG. 3A is a block diagram illustrating an example packet 301 transmitted from a packet output unit to a network interface. The packet 301 includes both the original packet 310, as well as a pipe ID 315. As described above with reference to FIG. 2, a packet output unit 246 may attach the pipe ID to the packet 310, and then forward the processed packet 301 to the network interface 222A-E. The network interface 222A-E, in processing the packet 301 further for transmittal to a network device (e.g., network devices 190A-N), may remove the pipe ID 315.

Figure 3B:
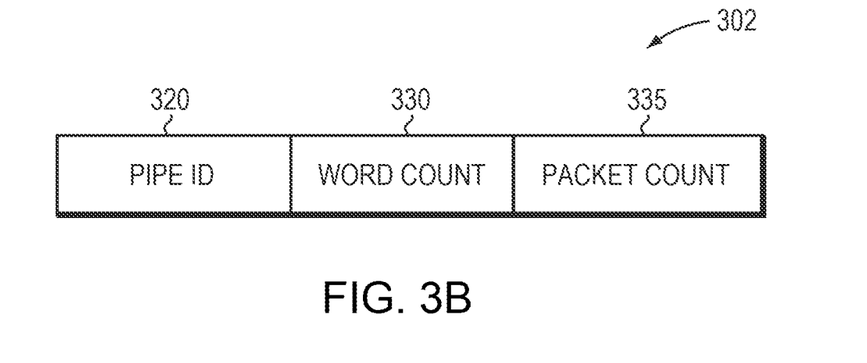
FIGS. 3B-C are block diagrams illustrating count update messages provided to a counter unit.
Figure 3C:
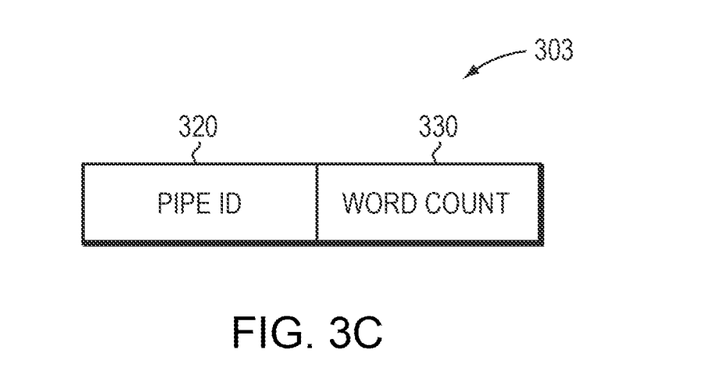

FIGS. 3B-C are block diagrams illustrating count update messages 302, 303 provided to a counter unit. As described above with reference to FIG. 2, a packet output unit 246 may send a count update message 302, 303 to a counter unit 240 when a packet is scheduled for transmittal, and a network interface 222A-E may send a further count update message 302, 303 to a counter unit 240 when a packet is cleared by the network interface 222A-E. The counter message 302 includes a pipe ID 320, a word count 330, and a packet count 335, thereby providing sufficient information to increment or decrement both a packet counter and a word counter. The packet count 335 indicates the number of packets referenced by the counter message 302. For example, if counter messages are send periodically, each message may account for several packets. Alternatively, if a separate counter message is transmitted for every packet that is scheduled or cleared, then the packet count 335 may be unnecessary. In such a case, the packet output unit and network interface may employ the counter message 303, which includes only the pipe ID and the word count 330.

Figure 4:
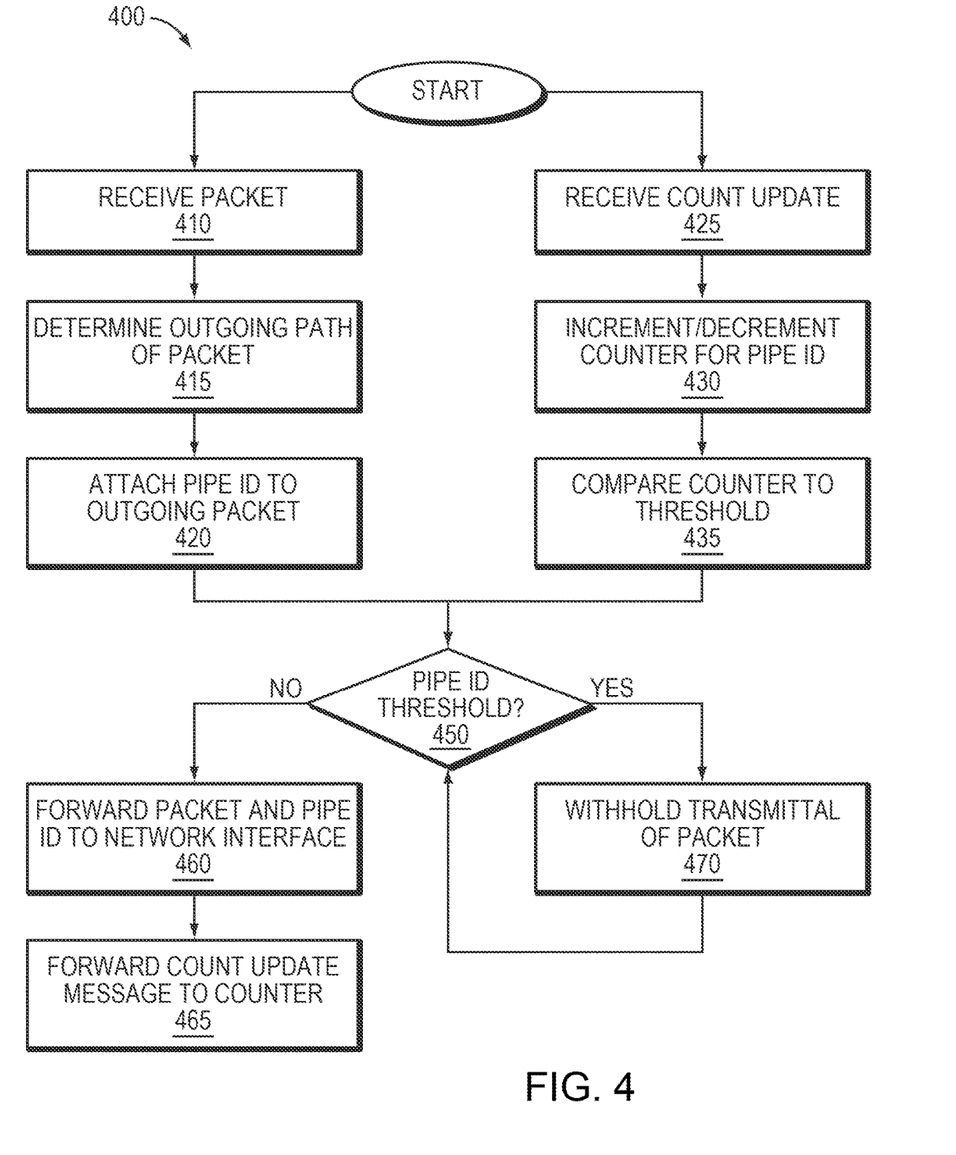
FIG. 4 is a flow diagram illustrating a method of processing a packet and controlling packet traffic in one embodiment.

FIG. 4 is a flow diagram illustrating a method 400 of processing a packet and controlling packet traffic in one embodiment. The method 400 may be implemented in the network processor 100 and component packet output unit 246 and network interfaces 222A-E as described above with reference to FIGS. 1 and 2.

With reference to FIG. 2, a packet is received to the packet output unit 246 (410), which determines the outgoing path of the packet (415). Based on this determination, the packet output unit 246 attaches the corresponding pipe ID to the packet (420). Concurrently, the counter 240 (which may be a component of the packet output unit 246) may receive a count update message from the packet output unit 246 or a network interface 222A associated with the pipe ID (425). If so, the counter 240 increments or decrements the counter for the pipe ID accordingly (430). The counter 240 then compares the current count (e.g., packet count and/or word count) to a respective threshold (435). If one or both of the pipe ID thresholds is exceeded (450), then the packet output unit 246 refrains from scheduling that packet for transmittal (470). The packet output unit 246 may return periodically to determine whether the threshold is no longer exceeded. If the threshold is not exceeded, then the packet output unit 246 may forward the packet with the attached pipe ID to the respective network interface 222A (460). When scheduling the packet for forwarding, the packet output unit 246 may also forward a respective count update message to the counter 240 to increment the counter for the pipe ID accordingly (465).

While this invention has been particularly shown and described with references to example embodiments thereof, it will be understood by those skilled in the art that various changes in form and details may be made therein without departing from the scope of the invention encompassed by the appended claims.

What is claimed is:

1. A system for controlling packet traffic in a network, comprising:
a plurality of network interfaces configured to transmit packets to a plurality of receivers across a network;

a control circuit configured to select the packets for forwarding to the plurality of network interfaces, the control circuit attaching a pipe identifier (ID) to each of the packets, the pipe ID indicating an internal path connecting the control circuit to one of the plurality of network interfaces through which the packet is to be transmitted, the internal path being one of a plurality of internal paths, each of the plurality of internal paths connecting the control circuit to a respective one of the plurality of network interfaces; and a counter configured to maintain a count of packets to be transmitted by each network interface per pipe ID, the counter comparing the count against a threshold and providing an indication to the control circuit in response to the count exceeding the threshold, the counter updating the count based on a count update message provided by the control circuit, the count update message including the pipe ID and a word count indicating a data size of the packet;

wherein the control circuit, in response to the indication from the counter, limits packet traffic through the internal path associated with the pipe ID and refrains from scheduling further packet for transmittal through the internal path.

2. The system of claim 1, wherein the control circuit is further configured to limit packet traffic through one of the paths in response to receiving a backpressure command from one of the plurality of receivers.

3. The system of claim 1, wherein the counter is further configured to maintain a count of bytes of the packets to be transmitted by the network interface per pipe ID, the counter comparing the count of bytes against a byte threshold and providing a second indication to the control circuit in response to the count of bytes exceeding the threshold.

4. The system of claim 3, wherein the control circuit, in response to the second indication from the counter, limits packet traffic through the path associated with the pipe ID.

5. The system of claim 1, wherein the path includes a port at the control circuit and a channel connecting one of the plurality of network interfaces to one of the plurality of receivers.

6. The system of claim 1, wherein the counter is configured to increment a value in response to the control circuit scheduling one of the packets for transmittal to one of the plurality of network interfaces, the value being associated with the packet ID of the packet.

7. The system of claim 6, wherein the counter is configured to decrement the value in response to the network interface transmitting the packet to the receiver.

8. The system of claim 1, wherein the counter is configured to maintain an additional count of packets to be transmitted by each network interface, the additional count being specific to an individual one of the plurality of network interfaces.

9. The system of claim 8, wherein the counter compares the additional count against a threshold and providing an indication to the control circuit in response to the count exceeding the threshold.

10. The system of claim 1, wherein the counter maintains the count based on a status of a plurality of buffers at each of the plurality of network interfaces, each of the plurality of buffers being associated with a path.

11. The system of claim 1, wherein the counter maintains the count based on a status of a plurality of buffers at the control circuit, each of the plurality of buffers being associated with a path.

* * * * *